(12) United States Patent
Tanaka

(10) Patent No.: US 8,068,944 B2
(45) Date of Patent: Nov. 29, 2011

(54) CONTROL APPARATUS FOR INTERNAL COMBUSTION ENGINE

(75) Inventor: Hiroyuki Tanaka, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 319 days.

(21) Appl. No.: 12/450,144

(22) PCT Filed: Mar. 12, 2008

(86) PCT No.: PCT/JP2008/054454
§ 371 (c)(1),
(2), (4) Date: Sep. 14, 2009

(87) PCT Pub. No.: WO2008/139774
PCT Pub. Date: Nov. 20, 2008

(65) Prior Publication Data
US 2010/0114458 A1    May 6, 2010

(30) Foreign Application Priority Data
May 16, 2007    (JP) .................................. 2007-130868

(51) Int. Cl.
*F02D 11/10* (2006.01)
(52) U.S. Cl. ......... 701/4; 701/105; 123/399; 123/406.5; 123/492
(58) Field of Classification Search ............. 123/399, 123/406.25, 406.36, 406.46, 406.5, 492; 701/104, 105
See application file for complete search history.

(56) References Cited

U.S. PATENT DOCUMENTS

| | | | | |
|---|---|---|---|---|
| 5,595,159 A | * | 1/1997 | Huber et al. | 123/362 |
| 6,006,724 A | * | 12/1999 | Takahashi et al. | 123/339.19 |
| 6,202,630 B1 | * | 3/2001 | Yip | 123/352 |
| 6,273,060 B1 | * | 8/2001 | Cullen | 123/325 |
| 6,276,333 B1 | | 8/2001 | Kazama et al. | |
| 6,318,349 B1 | | 11/2001 | Muto et al. | |
| 6,343,586 B1 | * | 2/2002 | Muto et al. | 123/406.25 |
| 6,418,907 B1 | * | 7/2002 | Frech et al. | 123/325 |
| 7,004,144 B2 | * | 2/2006 | Stroh et al. | 123/399 |
| 7,937,211 B2 | * | 5/2011 | Aso | 701/110 |
| 2002/0132701 A1 | | 9/2002 | Mabuchi et al. | |
| 2004/0107034 A1 | * | 6/2004 | Togai et al. | 701/54 |

FOREIGN PATENT DOCUMENTS

| | | |
|---|---|---|
| JP | A-2000-097073 | 4/2000 |
| JP | A-2000-328993 | 11/2000 |
| JP | A-2001-003790 | 1/2001 |
| JP | A-2002-276447 | 9/2002 |
| JP | A-2003-527518 | 9/2003 |

\* cited by examiner

Primary Examiner — Erick Solis
(74) Attorney, Agent, or Firm — Oliff & Berridge, PLC

(57) ABSTRACT

The present application relates to a control apparatus for an internal combustion engine. It is an object of the present application to prevent an excessive reaction of a throttle valve when the opening of the throttle valve is controlled on the basis of a plurality of required torques. The control apparatus includes: required torque consolidation means for calculating an after-consolidation required torque; first torque control means which causes an actual torque to follow variation of the after-consolidation required torque by changing the opening of the throttle valve in accordance with the variation of the after-consolidation required torque; and second torque control means which fixes the opening of the throttle valve and causes the actual torque to follow variation of the after-consolidation required torque.

8 Claims, 4 Drawing Sheets

CONTROL APPARATUS FOR INTERNAL COMBUSTION ENGINE

TECHNICAL FIELD

The present invention relates to a control apparatus for an internal combustion engine.

BACKGROUND ART

A technology disclosed in JP-A-2000-97073 relates to a control apparatus for an internal combustion engine and prevents an excessive throttle valve reaction to a small change in a target torque in a region where a throttle opening greatly changes in response to a change in the target torque. In the above region, the control apparatus calculates the throttle opening from an accelerator opening. In a region other than the above region, however, the control apparatus calculates the throttle opening from the target torque.
Patent Document 1: JP-A-2000-97073
Patent Document 2: JP-A (PCT) No. 527518/2003

DISCLOSURE OF THE INVENTION

Problem to be Solved by the Invention

However, the target torque is output not only in accordance with a driver's request which is reflected in the accelerator opening, but also in accordance, for instance, with a request of vehicle motion control. The conventional technology described above is disadvantageous in that it cannot comply with a request generated for vehicle motion control and other requests that are not generated by a driver.

The present invention has been made in view of the above circumstances. An object of the present invention is to provide a control apparatus for an internal combustion engine, the control apparatus being capable of preventing an excessive throttle valve reaction when controlling the opening of a throttle valve is performed on the basis of a plurality of required torques.

Means for Solving the Problem

First aspect of the present invention is a control apparatus for an internal combustion engine, the control apparatus comprising:
a throttle valve installed in an intake path of the internal combustion engine;
at least one actuator capable of changing a torque of the internal combustion engine by a method other than by changing the opening of the throttle valve;
a plurality of required torque output means each of which outputs a required torque on the basis of its own purpose to the internal combustion engine;
required torque consolidation means for calculating an after-consolidation required torque, the after-consolidation required torque being determined by consolidating the required torques output from the plurality of required torque output means;
sensitivity judgment means for judging whether the sensitivity of opening variation of the throttle valve corresponding to torque variation is higher than a reference value;
first torque control means which, when the sensitivity is lower than the reference value, causes an actual torque to follow variation of the after-consolidation required torque by changing the opening of the throttle valve in accordance with the variation of the after-consolidation required torque; and
second torque control means which, when the sensitivity is higher than the reference value, fixes the opening of the throttle valve and causes the actual torque to follow variation of the after-consolidation required torque by changing the operation amount of the actuator in accordance with the variation of the after-consolidation required torque.

Second aspect of the present invention is the control apparatus according to the first aspect, wherein, when the opening of the throttle valve is fixed, the second torque control means maintains a larger opening than an opening corresponding to the after-consolidation required torque.

Third aspect of the present invention is the control apparatus according to the first or the second aspect, further comprising, as the actuator, at least one of the followings: an ignition device capable of changing ignition timing, a fuel injection device, and a variable valve device capable of changing the valve opening characteristics of an intake valve and/or an exhaust valve.

Fourth aspect of the present invention is the control apparatus according to any one of the first to the third aspects, further comprising:
different types of the actuator;
wherein the second torque control means selects a particular type of the actuator for changing the actual torque from the different types of the actuator in accordance with operating status.

Advantages of the Invention

The first aspect of the present invention makes it possible to judge, on the basis of an after-consolidation required torque obtained by consolidating a plurality of required torques brought to the internal combustion engine, whether the sensitivity of opening variation of the throttle valve corresponding to torque variation is high. When the sensitivity is low, the actual torque can be made to follow variation of the after-consolidation required torque by changing the opening of the throttle valve in accordance with the variation of the after-consolidation required torque. When, on the other hand, the sensitivity is high, the actual torque can be made to follow the variation of the after-consolidation required torque by fixing the opening of the throttle valve and changing the operation amount of an actuator other than the throttle valve in accordance with the variation of the after-consolidation required torque. Therefore, even in a region where the sensitivity of opening variation of the throttle valve corresponding to torque variation is high, it is possible to surely prevent the throttle valve from exhibiting an excessive reaction (performing an undue operation). Consequently, the durability of the throttle valve can be enhanced to avoid contingencies such as malfunction.

When the opening of the throttle valve is fixed, the second aspect of the present invention fixes the opening of the throttle valve at an opening larger than that for the after-consolidation required torque. When an actuator other than the throttle valve is used to change the torque with the throttle valve opening fixed, it is easier to decrease the torque than to increase it. As the second aspect of the present invention fixes the opening of the throttle valve at an opening larger than that for the after-consolidation required torque, the actual torque can be made to follow the after-consolidation required torque by decreasing the actual torque for correction purposes. Therefore, it is possible to have the actual torque follow the after-consolidation required torque with increased accuracy and ease.

When the opening of the throttle valve is fixed, the third aspect of the present invention makes it possible to have the actual torque follow the after-consolidation required torque promptly and accurately by changing at least one of the followings: ignition timing, fuel injection amount, and intake valve and/or exhaust valve opening characteristics.

When the opening of the throttle valve is fixed, the fourth aspect of the present invention can select one of a plurality of different actuators in accordance with an operating state and use the selected actuator to change the actual torque. This makes it possible to avoid an adverse effect of a change in the operation amount of the selected actuator. Consequently, the performance demanded in the operating state can be improved.

Figure 1:
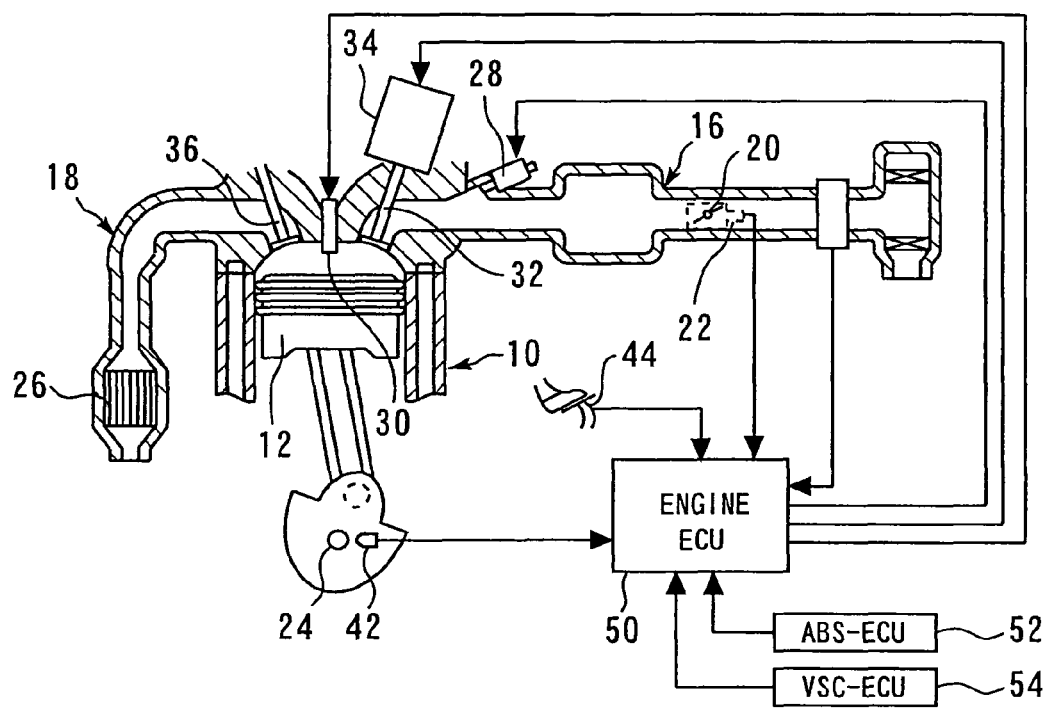
FIG. 1 shows the configuration of a system according to a first embodiment of the present invention.

DESCRIPTION OF REFERENCE NUMERALS 10 internal combustion engine
12 piston
16 intake path
18 exhaust path
20 throttle valve
26 catalyst
32 intake valve
34 intake variable valve device
36 exhaust valve
50 ECU

BEST MODE FOR CARRYING OUT THE INVENTION

First Embodiment

Description of System Configuration

FIG. 1 is a diagram illustrating the configuration of an internal combustion engine system according to a first embodiment of the present invention. The system shown in FIG. 1 includes an internal combustion engine 10 which is mounted in a vehicle. The number of cylinders in the internal combustion engine 10 and the arrangement of the cylinders are not specifically defined. Each cylinder of the internal combustion engine 10 includes a piston 12. Further, each cylinder is in communication with an intake path 16 and an exhaust path 18.

An electronically controlled throttle valve 20 is installed in the intake path 16. A throttle position sensor 22 is installed near the throttle valve 20 to detect the opening of the throttle valve 20 (hereinafter referred to as the "throttle opening"). A catalyst 26 for purifying an exhaust gas is installed in the exhaust path 18.

Each cylinder of the internal combustion engine 10 also includes a fuel injector 28 for injecting fuel into an intake port, an ignition plug 30 for igniting an air-fuel mixture in a combustion chamber, an intake valve 32, and an exhaust valve 36. The present invention is applicable not only to a port injection engine shown in the figure, but also to an intra-cylinder direct injection engine and the combination of these engines.

The intake valve 32 is driven by an intake variable valve device 34. The intake variable valve device 34 is capable of changing the valve opening characteristics (e.g., lift amount, operating angle, opening/closing timing, etc.) of the intake valve 32.

A crank angle sensor 42 is installed near a crankshaft 24 of the internal combustion engine 10 to detect a rotation angle of the crankshaft 24 (crank angle). An accelerator position sensor 44 is installed near an accelerator pedal to detect an accelerator opening.

The system also includes an engine ECU (Electronic Control Unit) 50. The engine ECU (hereinafter simply referred to as the "ECU") 50 is electrically connected to various sensors such as the aforementioned throttle position sensor 22, crank angle sensor 42, and accelerator position sensor 44, and various actuators such as the aforementioned throttle valve 20, fuel injector 28, and ignition plug 30.

The system further includes an ABS-ECU 52 for controlling a vehicle's anti-lock braking system and a VSC-ECU 54 for controlling a vehicle stability control system.

[Features of First Embodiment]

In the present embodiment, a plurality of required torques are brought to the internal combustion engine 10. The required torques include, for instance, a driver required torque which is required by a driver and calculated from the accelerator opening, an accessory drive required torque which is required for driving accessories, an ABS required torque which is output from the ABS-ECU 52, and a VSC required torque which is output from the VSC-ECU 54.

On the basis of the plurality of required torques, the ECU 50 calculates a throttle opening command value for the throttle valve 20. First of all, a comparative example of a throttle opening control method will be described to facilitate the understanding of operation and advantages of the present embodiment.

(Comparative Example of Throttle Opening Control Method)

Figure 2:
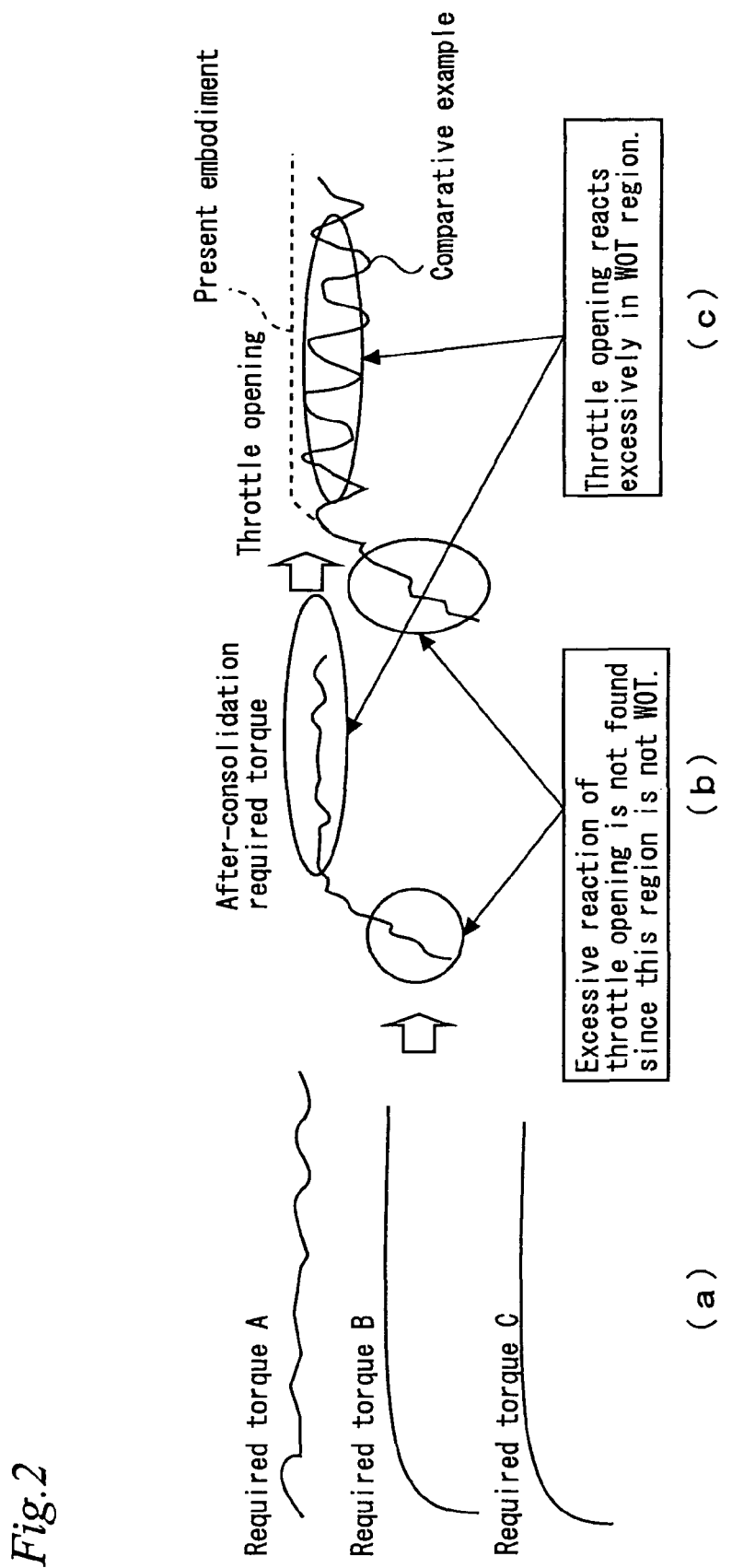
FIG. 2 is a diagram illustrating a throttle opening control method.

FIG. 2 is a diagram illustrating a throttle opening control method. As shown in FIG. 2 (a), it is assumed that there are three required torques (required torques A, B, and C). In marked contrast to required torques B and C, required torque A has very small fluctuations.

FIG. 2 (b) shows a required torque which is obtained by consolidating (e.g., adding) required torques A, B, and C. The required torque is hereinafter referred to as the "after-consolidation required torque". The after-consolidation required torque fluctuates due to the fluctuation of required torque A.

In the internal combustion engine 10, torque is determined in accordance with an engine speed and throttle opening. The ECU 50 stores a torque/throttle opening map, which indicates the relationship among the engine speed, the torque and throttle opening. In the comparative example, the after-consolidation required torque is directly converted to a throttle opening in accordance with the map. A solid line in FIG. 2 (c) represents the throttle opening in the comparative example.

In the internal combustion engine 10, the sensitivity of throttle opening variation corresponding to torque variation is generally high in a region where the throttle valve 20 is in a state close to a WOT (Wide Open Throttle) state. This region is hereinafter referred to as the highly sensitive throttle opening region.

In the comparative example, the after-consolidation required torque is directly converted to a throttle opening even when the after-consolidation required torque is changing in the highly sensitive throttle opening region. Therefore, the throttle opening changes excessively as shown in FIG. 2 (c). More specifically, the throttle valve 20 reacts excessively and repeats a rapid operation. As a result, the throttle valve 20 becomes burdened so that a malfunction or other problem may occur.

(Throttle Opening Control Method according to First Embodiment)

A broken line in FIG. 2 (c) represents the throttle opening in the present embodiment. As shown in the figure, the present embodiment avoids the above-described problem by setting the throttle opening to a fixed value in the highly sensitive throttle opening region. While the throttle opening is fixed, the present embodiment changes the operation amount of an actuator other than the throttle valve 20 to ensure that the actual torque of the internal combustion engine 10 follows variation of the after-consolidation required torque.

The actuator to be used in the above instance may be, for example, an ignition device including the ignition plug 30, a fuel injection device including the fuel injector 28, or the intake variable valve device 34. Even when the throttle opening is fixed, the actual torque can be made to follow the variation of the after-consolidation required torque by changing the ignition timing with the ignition device, changing the fuel injection amount or cutting the fuel supply with the fuel injection device, or changing the valve opening characteristics of the intake valve 32 with the intake variable valve device 34.

The method according to the present embodiment, which has been described above, sets the throttle opening to a fixed value in the highly sensitive throttle opening region, thereby making it possible to surely prevent the throttle opening from changing excessively. Further, while the throttle opening is fixed, the actual torque can be quickly changed by changing the ignition timing, changing the fuel injection amount, cutting the fuel supply, or changing the valve opening characteristics of the intake valve 32. Therefore, the actual torque can be made to accurately follow the variation of the after-consolidation required torque.

[Details of Process Performed by First Embodiment]

Figure 3:
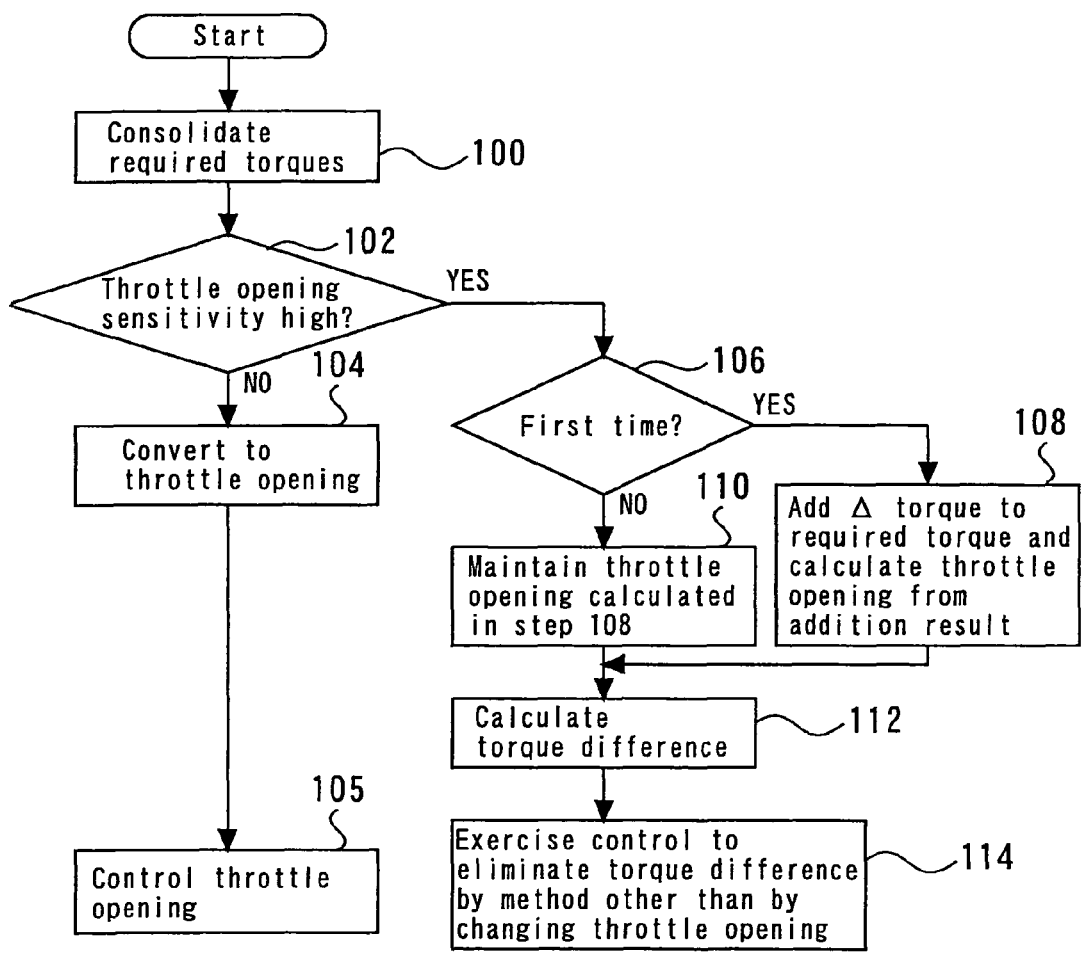
FIG. 3 is a flowchart illustrating a routine that is executed by the first embodiment of the present invention.

FIG. 3 is a flowchart illustrating a routine that the ECU 50 executes in the present embodiment to implement the above-described functionality. First of all, the routine shown in FIG. 3 performs step 100 to consolidate (e.g., add) a plurality of required torques brought to the internal combustion engine 10.

Next, on the basis of the after-consolidation required torque calculated in step 100, the routine performs step 102 to judge whether the sensitivity of throttle opening variation corresponding to torque variation is high, that is, whether it is within the highly sensitive throttle opening region. This judgment step is performed, for instance, by checking whether the after-consolidation required torque is within the highly sensitive throttle opening region predefined in the aforementioned torque/throttle opening map. Alternatively, this judgment step may be performed by calculating a slight change $\Delta TA$ in the throttle opening by probatively converting a slight change $\Delta Trq$ in the after-consolidation required torque on the basis of the torque/throttle opening map, and concluding, when the quotient $\Delta TA/\Delta Trq$ is greater than a predetermined threshold value, that the after-consolidation required torque is within the highly sensitive throttle opening region.

When the judgment result obtained in step 102 indicates that the after-consolidation required torque is not within the highly sensitive throttle opening region, it can be concluded that no excessive change in throttle opening occurs even when the after-consolidation required torque is directly converted to a throttle opening. In this instance, therefore, the routine performs step 104 to convert the after-consolidation required torque to a throttle opening on the basis of the torque/throttle opening map, then proceeds to step 105, and drives the throttle valve 20 in such a manner as to provide the throttle opening derived from the conversion.

When, on the other hand, the judgment result obtained in step 102 indicates that the after-consolidation required torque is within the highly sensitive throttle opening region, the routine performs step 106 to determine whether the judgment formulated in step 102 is the first of its kind, that is, whether the after-consolidation required torque has just entered the highly sensitive throttle opening region.

If the result obtained in step 106 indicates that the judgment formulated in step 102 is the first of its kind, the routine performs step 108 to add a predetermined $\Delta$ torque (additional torque) to the after-consolidation required torque calculated in step 100, calculate a throttle opening corresponding to the value derived from the addition (hereinafter referred to as the "increased required torque") on the basis of the torque/throttle opening map, and drive the throttle valve 20 in such a manner as to provide the calculated throttle opening.

It should be noted that the $\Delta$ torque is added to the after-consolidation required torque in step 108 for the purpose of maintaining a larger throttle opening than a throttle opening corresponding to the after-consolidation required torque as shown in FIG. 2 (c). The actual torque can be decreased by retarding the ignition timing, reducing the fuel injection amount, or cutting the fuel supply. Therefore, a decrease in the actual torque can be achieved with more easiness and promptness than an increase in the actual torque. In view of such circumstances, the present embodiment maintains a larger throttle opening than a throttle opening corresponding to the after-consolidation required torque when the throttle opening is to be fixed. Therefore, the actual torque can be made to follow the after-consolidation required torque by decreasing the actual torque for correction purposes. This makes it possible to have the actual torque follow the after-consolidation required torque with increased accuracy and ease.

Further, the magnitude of the $\Delta$ torque may be changed in accordance with a source of a fluctuating required torque (required torque A in FIG. 2 (a)). When, for instance, the fluctuating required torque is required from a driver, the range of its fluctuation may be enlarged. It is therefore preferred that the $\Delta$ torque be set to a great value. When, on the other hand, the fluctuating required torque is a VSC required torque, the range of its fluctuation does not usually become significantly large. In this case, it is preferred that the $\Delta$ torque be set to a small value.

Meanwhile, when the result obtained in step 106 indicates that the judgment formulated in step 102 is not the first of its kind (is the second or subsequent one), the routine proceeds to step 110. In step 110, the throttle valve 20 is controlled so as to maintain the throttle opening calculated in step 108.

After completion of step 108 or 110, the routine performs step 112 to calculate the difference between the increased required torque calculated in step 108 and the after-consolidation required torque calculated in step 100. Next, the routine performs step 114 to control the operation amount of a predetermined actuator other than the throttle valve 20 (the ignition timing, the fuel injection amount, or the valve opening characteristics of the intake valve 32 in the present embodiment) in such a manner as to eliminate the calculated torque difference.

As described above, even when the after-consolidation required torque is within the highly sensitive throttle opening region, the present embodiment makes it possible to surely prevent the throttle opening from changing excessively (drastically). Therefore, the durability of the throttle valve 20 can be enhanced to avoid malfunction.

In the first embodiment, which has been described above, the ABS-ECU 52 and VSC-ECU 54 correspond to the "required torque output means" according to the first aspect of the present invention. Further, the "required torque output means" according to the first aspect are implemented when the ECU 50 calculates the driver required torque in accordance with the accelerator opening and calculates the accessory drive required torque in accordance with the operating status of accessories; the "sensitivity judgment means" according to the first aspect is implemented when the ECU 50 performs steps 100 and 102; the "first torque control means" according to the first aspect is implemented when the ECU 50 performs steps 104 and 105; and the "second torque control means" according to the first aspect is implemented when the ECU 50 performs steps 106 to 114.

In a case where the present invention is applied to an internal combustion engine having an exhaust variable valve device that changes the valve opening characteristics of the exhaust valve 36, the actual torque may be made to follow the variation of the after-consolidation required torque by changing the valve opening characteristics of the exhaust valve when the throttle opening is fixed.

Second Embodiment

A second embodiment of the present invention will now be described with reference to FIG. 4. However, the differences between the second embodiment and the above-described first embodiment will be mainly described while abridging or omitting the description of matters common to these embodiments. The second embodiment is implemented when it uses the same system configuration as the first embodiment, which is shown in FIG. 1, and causes the ECU 50 to execute a later-described routine shown in FIG. 4.

[Features of Second Embodiment]

In the first embodiment, which has been described earlier, the ignition device, fuel injection device, or intake variable valve device 34 is preselected as the actuator for exercising control to have the actual torque follow the after-consolidation required torque when the throttle opening is fixed. On the other hand, the second embodiment selects the ignition device, fuel injection device, or intake variable valve device 34 in accordance with the operating status of the internal combustion engine 10.

If the torque is decreased by retarding the ignition timing, fuel efficiency easily decreases. Further, if the torque is changed by changing the air-fuel ratio (A/F) (fuel injection amount), emissions performance is easily affected. As described above, the influence on various performance characteristics of the internal combustion engine 10 varies with the type of the actuator that changes the torque. When the throttle opening is fixed, the present embodiment selects the ignition device, fuel injection device, or intake variable valve device 34 as an optimum actuator for changing the torque in accordance with an operating state, thereby improving the performance demanded in the operating state.

[Details of Process Performed by Second Embodiment]

Figure 4:
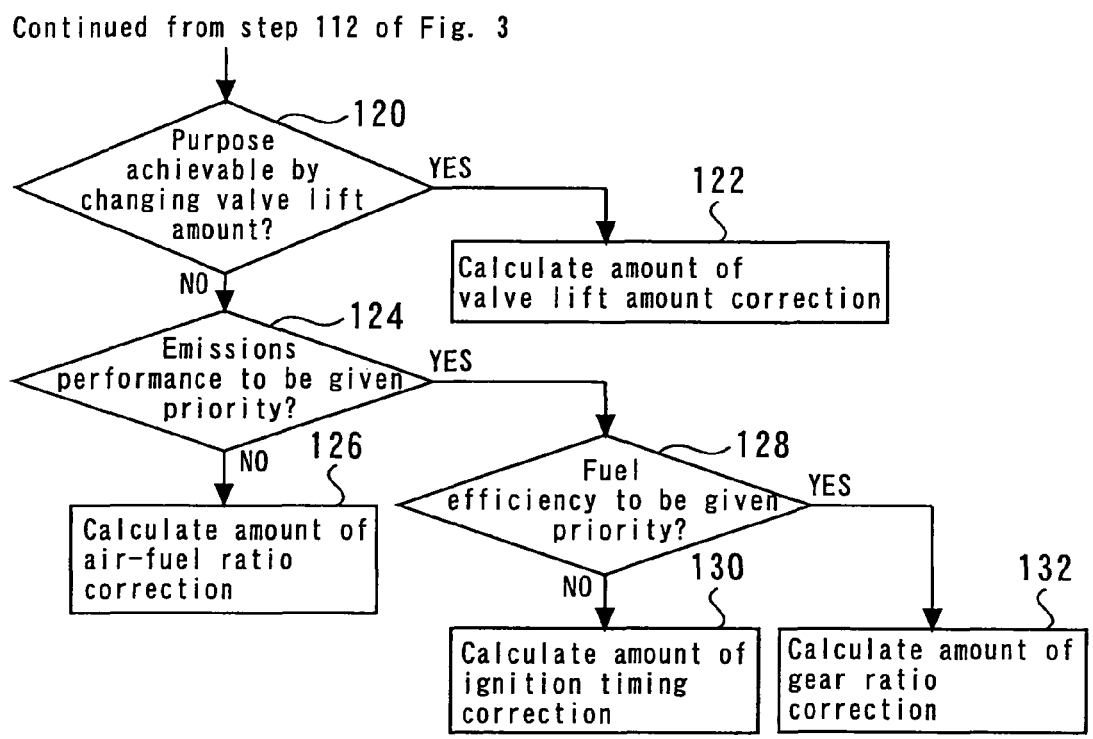
FIG. 4 is a flowchart illustrating a routine that is executed by the second embodiment of the present invention.

FIG. 4 is a flowchart illustrating a routine that the ECU 50 executes in the present embodiment to implement the above-described functionality. In the present embodiment, it is assumed that the routine shown in FIG. 4 is executed subsequently to step 112 of the previously-described routine shown in FIG. 3.

First of all, the routine shown in FIG. 4 performs step 120 to judge whether the torque difference calculated in step 112 of FIG. 3 (hereinafter simply referred to as the "torque difference") can be eliminated by allowing the intake variable valve device 34 to change the lift amount of the intake valve 32 (hereinafter simply referred to as the "valve lift amount"). When the torque is changed by changing the valve lift amount, fuel efficiency does not easily deteriorate. Further, the air-fuel ratio (A/F) remains unchanged so that emissions performance will not be adversely affected. However, the response of torque to change in the valve lift amount is slightly slower than the response of torque to change in the ignition timing or fuel injection amount. Therefore, when there is a great torque difference, it is difficult to eliminate the torque difference by changing the valve lift amount. Therefore, when the torque difference is not greater than a predetermined value, it is judged in step 120 that the torque difference can be eliminated by changing the valve lift amount. When, on the other hand, the torque difference is greater than the predetermined value, it is judged in step 120 that the torque difference cannot be eliminated by changing the valve lift amount.

When the judgment result obtained in step 120 indicates that the torque difference can be eliminated by changing the valve lift amount, step 122 is performed to select a method of changing a valve lift amount as the method of having the actual torque follow the after-consolidation required torque and calculate the amount of valve lift amount correction required for eliminating the torque difference. The intake variable valve device 34 is then controlled to provide the calculated correction amount.

When, on the other hand, the judgment result obtained in step 120 indicates that the torque difference cannot be eliminated by changing the valve lift amount, step 124 is performed to judge whether emissions performance should be given priority. This judgment step is performed in accordance, for instance, with the status of the catalyst 26 (oxygen storage amount, temperature, etc.) or the status of an air-fuel ratio sensor (not shown).

When the judgment result obtained in step 124 indicates that emissions performance need not be given priority, step 126 is performed to select a method of changing an air-fuel ratio (A/F) as the method of having the actual torque follow the after-consolidation required torque and calculate the amount of air-fuel ratio (A/F) correction required for eliminating the torque difference. The amount of fuel injection from the fuel injector 28 is then controlled to provide the calculated correction amount.

When, on the other hand, the judgment result obtained in step 124 indicates that emissions performance should be given priority, step 128 is performed to judge whether fuel efficiency should be given priority. When the judgment result obtained in step 128 indicates that fuel efficiency need not be given priority, step 130 is performed to select a method of changing an ignition timing as the method of having the actual torque follow the after-consolidation required torque and calculate the amount of ignition timing correction required for eliminating the torque difference. The ignition device is then controlled to provide the calculated correction amount.

When, on the other hand, the judgment result obtained in step 128 indicates that fuel efficiency should be given priority, step 132 is performed to control the torque to be transmitted to a drive shaft of the vehicle by correcting the gear ratio of a continuously variable transmission mounted in the vehicle. The same effect as that of changing the torque of the internal combustion engine 10 is then produced in a pseudo manner.

In the present embodiment, step 132 need not necessarily be performed. Further, when the judgment result obtained in step 124 indicates that emissions performance should be given priority, an alternative is to skip step 128 which is a judgment step, and proceed to step 130.

The invention claimed is:

1. A control apparatus for an internal combustion engine, the control apparatus comprising:
   a throttle valve installed in an intake path of the internal combustion engine;
   at least one actuator capable of changing a torque of the internal combustion engine by a method other than by changing the opening of the throttle valve;
   a plurality of required torque output means each of which outputs a required torque on the basis of its own purpose to the internal combustion engine;
   required torque consolidation means for calculating an after-consolidation required torque, the after-consolidation required torque being determined by consolidating the required torques output from the plurality of required torque output means;
   sensitivity judgment means for judging whether the sensitivity of opening variation of the throttle valve corresponding to torque variation is higher than a reference value;
   first torque control means which, when the sensitivity is lower than the reference value, causes an actual torque to follow variation of the after-consolidation required torque by changing the opening of the throttle valve in accordance with the variation of the after-consolidation required torque; and
   second torque control means which, when the sensitivity is higher than the reference value, fixes the opening of the throttle valve and causes the actual torque to follow variation of the after-consolidation required torque by changing the operation amount of the actuator in accordance with the variation of the after-consolidation required torque.

2. The control apparatus according to claim 1, wherein, when the opening of the throttle valve is fixed, the second torque control means maintains a larger opening than an opening corresponding to the after-consolidation required torque.

3. The control apparatus according to claim 1, further comprising, as the actuator, at least one of the followings: an ignition device capable of changing ignition timing, a fuel injection device, and a variable valve device capable of changing the valve opening characteristics of an intake valve and/or an exhaust valve.

4. The control apparatus according to claim 1, further comprising:
   different types of the actuator;
   wherein the second torque control means selects a particular type of the actuator for changing the actual torque from the different types of the actuator in accordance with operating status.

5. A control apparatus for an internal combustion engine, the control apparatus comprising:
   a throttle valve installed in an intake path of the internal combustion engine;
   at least one actuator capable of changing a torque of the internal combustion engine by a method other than by changing the opening of the throttle valve;
   a plurality of required torque output devices each of which outputs a required torque on the basis of its own purpose to the internal combustion engine;
   a required torque consolidation device for calculating an after-consolidation required torque, the after-consolidation required torque being determined by consolidating the required torques output from the plurality of required torque output devices;
   a sensitivity judgment device for judging whether the sensitivity of opening variation of the throttle valve corresponding to torque variation is higher than a reference value;
   a first torque control device which, when the sensitivity is lower than the reference value, causes an actual torque to follow variation of the after-consolidation required torque by changing the opening of the throttle valve in accordance with the variation of the after-consolidation required torque; and
   a second torque control device which, when the sensitivity is higher than the reference value, fixes the opening of the throttle valve and causes the actual torque to follow variation of the after-consolidation required torque by changing the operation amount of the actuator in accordance with the variation of the after-consolidation required torque.

6. The control apparatus according to claim 5, wherein, when the opening of the throttle valve is fixed, the second torque control device maintains a larger opening than an opening corresponding to the after-consolidation required torque.

7. The control apparatus according to claim 5, further comprising, as the actuator, at least one of the followings: an ignition device capable of changing ignition timing, a fuel injection device, and a variable valve device capable of changing the valve opening characteristics of an intake valve and/or an exhaust valve.

8. The control apparatus according to of claim 5, further comprising:
   different types of the actuator;
   wherein the second torque control device selects a particular type of the actuator for changing the actual torque from the different types of the actuator in accordance with operating status.

* * * * *